United States Patent [19]

Cummisford

[11] 3,725,324

[45] Apr. 3, 1973

[54] ART OF MANUFACTURING DRY WALL TAPING AND FINISHING COMPOUNDS WITH A NITROGENOUS-MODIFIED AMYLACEOUS BINDER

[75] Inventor: Robert G. Cummisford, Brookfield, Wis.

[73] Assignee: Krause Milling Company, Milwaukee, Wis.

[22] Filed: May 27, 1971

[21] Appl. No.: 147,644

[52] U.S. Cl. ............ 260/17.4 ST, 106/210, 106/214
[51] Int. Cl. ........................... C08b 25/02, C08d 9/06
[58] Field of Search ....... 260/17.4 ST, 17.3; 106/210, 106/214; 52/344

[56] References Cited

UNITED STATES PATENTS

| | | | |
|---|---|---|---|
| 3,279,934 | 10/1966 | Schuttner | 106/214 |
| 3,411,926 | 11/1968 | Gogek et al. | 106/210 |
| 3,485,776 | 12/1969 | Bruner et al. | 260/17.3 |

Primary Examiner—Harold D. Anderson
Assistant Examiner—Edward Woodberry
Attorney—Morsell & Morsell

[57] ABSTRACT

Urea is combined with a gelatinized amylaceous material using water in an amount less than 20 percent of the total mix, and the mixture is subsequently heated to obtain a binder for use in a dry wall finishing compound.

19 Claims, No Drawings

ART OF MANUFACTURING DRY WALL TAPING AND FINISHING COMPOUNDS WITH A NITROGENOUS-MODIFIED AMYLACEOUS BINDER

BACKGROUND OF THE INVENTION

1. Field of the Invention

The compound of the present invention is particularly useful as a dry wall joint cement used in the taping of dry wall joints or as a dry wall finish, and the improved binder portion is satisfactory for the preparation of acoustic finishes and other surface finishes for application to walls.

2. Description of the Prior Art

With the use of gypsum drywall as a wall surfacing material in construction projects certain adhesive fillers are used to close and fill the joints between adjoining pieces of dry wall. These same adhesive fillers and others with slightly changed formulations are also used to give novel textured finishes to the otherwise smooth dry wall surface.

In the past dry wall finishes have been formulated with a variety of binders and an even wider variety of inorganic filler pigments. The binders most often used have been casein, soy protein, pregelatinized oxidized starch, polyvinyl alcohol and polyvinyl acetate either as a spray dried powder or water emulsion. The inorganic fillers used having included limestone flour, mica, talc, clays, asbestos, titanium dioxide, calcined clays and others common to adhesive and paint technology.

Inasmuch as the present invention relates primarily to a method which employs a novel binder, the shortcomings of the common binders will be listed. Casein has need for alkaline solubilizing salts which must be included in the formulation; the dry powder has limited storage stability due to decomposition or inactivation of these solubilizers. Casein also is difficult to preserve against microbiological attack particularly after the powder has been admixed with water prior to use. A.S.T.M. standard specification C 475-64 requires no putrefaction in less than 4 days. Preservative levels of 0.4 percent and greater are commonly used with casein to achieve this standard of performance. The amount of casein in such formulations usually is greater than 5 percent, in the range of 6–7 percent for a joint compound.

The soy proteins have the same disadvantages as casein. In addition they have a tendency to form a very hard surface upon drying, making them difficult to work with and to paint. Furthermore, they are slow to dissolve and require a high pH for solution. The use of soy protein in dry wall finishes has diminished because of these disadvantages.

The pregelatinized oxidized starches have as disadvantages a very soft characteristic upon drying and a tendency for the adhesive effectiveness to decrease as water demand decreases causing the formulator to choose between adhesive performance and workability during application. As a result these materials are commonly used as partial replacement for a more expensive binder to lower the cost of a binder system.

Polyvinyl alcohol is seldom used as the sole binder in dry wall finishes because of its sensitivity to other materials, its cost, and a tendency to have unsatisfactory application performance. It is most often used as a minor part of a binder system to impart special properties to the overall dry wall finish. Polyvinyl acetate as a spray dried powder has the disadvantages of high cost, poor workability and poor low temperature performance. By using it with other binder components these difficulties can be overcome. As an emulsion it can be used in ready-to-use wet finishes, but these have shipping and storage problems. By involved pre-mixing of the emulsion on a carrier material the emulsion can be used in a semi-dry mix, but this approach has not gained wide acceptability.

While the inclusion of urea into amylaceous adhesives to improve plasticity or flexibility is old, it is new to combine the amylaceous material and urea and subsequently heat the mixture to obtain a pregelatinized amylaceous material containing urea, except for British Pat. No. 1,127,198 in which a similar product is used as a ruminant feed.

In most cases of urea addition to amylaceous adhesives, the urea is added during or after cooking. The addition of urea to a pregelatinized cereal flour does not give the same result as does the present method where heating is performed in the presence of urea and in the presence of gelatinized material. Particularly, the workability and crack resistance suffer.

The patents which mention combination of urea and starch to form carbamates are similar to the present invention, but I do not form carbamate to any significant degree. Formation of carbamate requires the evolution of a mole of ammonia for each mole of carbamate formed. Nitrogen analysis of my products indicates little if any loss of nitrogen as ammonia during processing.

In the area of dry wall finish patents Gogek, U. S. Pat. No. 3,411,926, requires a blend of gelatinized and ungelatinized starch. In comparing the binder of my invention with the binder of Gogek, I find the only similarity in the fact that both use amylaceous starting materials. He specifies an oxidized starch, my binder is not oxidized. Further, the test data on my binder compared with data given in his examples indicate that while his adhesion increased as the binder was increased from 1 to 5 percent, the crack resistance decreased. In testing my binder I have found that both adhesion and crack resistance increase as the binder is increased from 3 to 5 percent. The materials claimed as binders are obviously different.

Protzman U.S. Pat. No. 3,137,592 uses 22 percent plasticizer and at least a 50° C. adiabatic temperature rise during extrusion cooking. In his teachings urea is equated with water as a plasticizer. Protzman has a general extruded starch patent covering a special set of operating conditions wherein the temperature is raised at least 50° C. adiabatically.

SUMMARY OF THE INVENTION

With the present invention, to obtain a binder for use in a dry wall taping and finishing compound, a cereal grain or an amylaceous fraction thereof is gelatinized in the presence of a non-volatile starch plasticizer such as urea or with another nitrogen compound related to urea. Alternatively, a pregelatinized cereal grain or amylaceous fraction thereof is admixed with the plasticizer and heated to effect an association of the plasticizer with the amylaceous material. With the present invention the binder portion of the dry wall finishing material is new and novel, and this comprises a minor portion of the joint cement. Any of a multitude of combinations of possible fillers, pigments, and other additives can be used for the major portion of the joint cement depending on the formulator's purpose.

A general object of the invention is to provide a dry wall compound for joint or finishing use which gives improved functional characteristics as compared with those materials presently available for a similar purpose in that the compound has excellent bonding qualities, resistance to cracking and shrinkage, and resistance to putrefaction.

A further object of the invention is to provide a dry wall compound including a novel cereal-based binder.

A still further object of the invention is to provide an improved compound for dry wall use in which both workability and crack resistance are improved coincidentally.

DESCRIPTION OF THE PREFERRED EMBODIMENT

The binder of the present invention is a cereal grain or an amylaceous fraction thereof which is gelatinized in the presence of a non-volatile starch plasticizer such as urea or a nitrogen compound related to urea using water in an amount less than 20 percent of the total mix with a heating step being performed in the presence of the urea and in the presence of the gelatinized material to bring the temperature to between 115° C. and 180° C. The nitrogen compound is of the family containing the chemical grouping

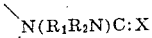

where X is O, S, or NH, and where $R_1$ is H or $CH_3$ and where $R_2$ is H or $CH_3$, and is present in the amount of 3 percent to 20 percent based on the weight of the flour. A specific series of compounds having this grouping would be of the general formula $(R_1R_2N)_2C:X$ where $R_1$ and $R_2$ are H or $CH_3$, and X is O or S.

Alternatively, the binder is a pregelatinized cereal grain or amylaceous fraction thereof intimately admixed with the plasticizer and then heated to bring the temperature to between 75° C. and 180° C. to effect an association of the plasticizer with the amylaceous material. A preferred method for simultaneously gelatinizing and heating involves extrusion cooking of the urea treated amylaceous material.

The gelatinization may be performed by any well known method and requires heating the starch in the presence of water to the gelatinization temperature of the starch. Where extrusion-cooking is employed the starch product is extruded into the atmosphere to provide an area of reduced pressure. The extrusion process is generally conducted at a temperature of between 115° C. and 177° C. at a pressure of between 100 and 350 psi, or greater. Where the extrusion process is employed the gelatinization and heating are done simultaneously in the presence of the urea and it is to be understood that when gelatinization and heating are recited in the claims that gelatinization and heating may be performed simultaneously, as in an extrusion-cooking process, or gelatinization may be performed first and heating later, it being essential that heating be done in the presence of both gelatinized amylaceous material and the urea or other nitrogen compound.

The cereal grains or fractions thereof that may be employed include corn flour, bleached gelatinized corn flour, corn starch, grain sorghum flour, milo meal and wheat flour.

The following are examples of nitrogen compounds that may be used: urea, $(H_2N)_2C:O$; thiourea, $(H_2N)_2C:S$; guanidine, $(H_2N)_2C:NH$; biurea, $[HN(H_2N)C:O]_2$; biuret, $HN[(H_2N)C:O]_2$; dicyandiamide, $NCNH(H_2N)C:NH$.

The urea treated binder may be used in various joint compound formulations as follows, the percentages being based on the total weight of the joint compound:

Part 1 – Urea-modified cereal binder  3 percent – 10 percent

Part 2 – Filler and pigment materials, together with such other additional materials as may be desired to provide smoother spreading, ease of mixing to control drying rate, shrinkage and to serve as a buffer to adjust the pH or to serve as a pigment dispersant. The basic ingredients of the filler may include mica, asbestos, and limestone, or calcium carbonate, together with such other materials as may be desired  90 percent – 97 percent Various of such other materials may be employed in Part 2 above as are well known in wallboard finishing compounds, and such materials may be employed in varying percentages. For convenience, Part 2 will be referred to in the claims merely as filler material. The formulation for Part 2, however, can be varied over a wide latitude depending upon the particular characteristics desired. While the use of some gummy substance to obtain smoother spreading is highly desirable, it is not absolutely essential. The following may be used for this purpose, among other things: hydroxyethyl cellulose, hydroxypropyl cellulose, carboxymethyl cellulose, guar gum, alginates, gum arabic, gum tragacanth. While not critical, it is also desirable to employ a small amount of a buffer which also serves to adjust the pH and which is a pigment dispersant. This may be sodium carbonate, sodium tripolyphosphate, sodium hexametaphosphate, sodium orthophosphate, sodium sesquicarbonate. A small amount of a plasticizer such as N-Butyl phthalate or sodium acetate may also be employed in Part 2. The remainder of Part 2 comprises filler and pigment materials which may be one or more of the following: limestone, clay, mica, asbestos, calcium carbonate.

The following examples illustrate the invention more specifically:

EXAMPLE 1

18 grams of a bleached extruded corn flour was admixed with 2 grams of urea and the mixture was heated in an oven for 2 hours at 100° C. When cooled the resulting product was ground to pass 80 mesh and used as the binder in a joint compound formulation consisting of:

| Binder | 5% | |
|---|---|---|
| Hydroxyethyl cellulose (WP 4400) | 0.2% | |
| Sodium tripolyphosphate | 0.5% | pigment |
| N-Butyl phthalate plasticizer | 0.3% | and |
| Asbestos shorts (7 RF-9) | 7.0% | filler |
| Kaolin clay (Kaolex CW) | 10.0% | materials |

| | |
|---|---|
| Mica (3X) | 15.0% |
| Calcium carbonate (No. 1 white) | 62.0% |

When mixed with water in a ratio of 100 parts joint compound to 65 parts water by weight an easy spreading joint compound resulted. The bond between embedded tape and the joint compound upon drying was 100 percent, only slight evidence of cracking was apparent. When bleached extruded corn flour which was not urea treated was used as a binder, a sticky hard-working joint compound with severe cracking upon drying resulted. The viscosities of the different materials used as binder in the above examples, when not urea treated, were 10 percent cold paste: 208 cps (Brookfield); and when urea treated, were 10 percent cold paste: 1320 cps (Brookfield). The fact that the higher viscosity material worked better as a joint compound binder is completely contrary to what is observed with common binders.

EXAMPLE 2

The urea-treated binder of Example 1 was used in another joint compound formulation in which 4 percent urea-treated product and 1 percent polyvinyl alcohol were used as a binder system. An easy-working joint compound with crack resistance resulted. This formulation was:

| | | |
|---|---|---|
| Urea-treated binder of Example 1 | 4% | |
| Polyvinyl alcohol | 1% | Binder |
| HEC (QP 15000) | 0.1% | |
| Sodium carbonate | 0.5% | |
| N-Butyl Phthalate | 0.3% | Pigment |
| Asbestos (7RF-9) | 7% | and |
| Mica (3X) | 5% | filler |
| Mica (4X) | 5% | materials |
| Clay (Kaolex CW) | 10% | |
| Limestone (No. 1 white) | 67% | |

This formulation met all ASTM C 475–64 requirements; it passed the requirement for putrefaction even though there was no preservative present. This compound, when admixed with water, was also usable after two freeze-thaw cycles.

EXAMPLE 3

A series of pregelatinized products were prepared by extrusion-cooking of a mixture of yellow corn meal, 10 percent urea and 17 percent water based on weight of corn meal, in a laboratory plastics extruder under conditions giving the following viscosities:

| | Brookfield Viscosity, cps. | |
|---|---|---|
| | Cold paste 10% | Hot paste 10% |
| Sample A | 510 | 221 |
| Sample B | 1560 | 630 |
| Sample C | 2720 | 3250 |
| Sample D | 1530 | 4400 |
| Sample E | 1650 | 3280 |
| Sample F | 1700 | 3930 |

All these products were acceptable joint compound binders in the formulations given in Examples 1 and 2, and performed especially well in the latter formulation. The working characteristics of the different joint compounds were different, offering the formulator a wide choice of working characteristics without sacrificing such functional characteristics as cracking, bond, shrinkage or resistance to putrefaction.

EXAMPLE 4

An extruded binder was prepared on a commercial size cooker-extruder using yellow corn flour, 0.08 percent benzoyl peroxide bleach and 10 percent urea by weight of flour with conditions during extrusion such that the following viscosities resulted:

| | Brookfield Cold paste 10% | Viscosity, cps. Hot paste 10% |
|---|---|---|
| A | 320 | 176 |
| B | 284 | 138 |

Both of these binders were suitable in formulations listed under Example 1. Reducing binder level to 4 percent resulted in acceptable joint compounds. Reducing the binder to 3 percent gave joint compounds having poor workability.

EXAMPLE 5

Corn starch with 10 percent urea by weight was processed with 18.1 percent water in a laboratory plastics extruder under conditions to give a cold paste viscosity of 2150 cps and a hot paste viscosity of 156 cps, both at 10 percent solids. When used as a binder in formulation from Example 1 this product also performed satisfactorily. When this binder was washed with methanol only 1 percent nitrogen was removed as unassociated urea.

EXAMPLE 6

Six extruded products using different nitrogen additives were made on a laboratory extruder with a maximum temperature of 150° C. with coarse corn meal, 18 percent moisture and 10 percent nitrogen compound based on dry weight of corn meal. The extrudate was ground to all pass 80 mesh. These ground materials were used in formulation of Example 2. Results are shown in Table I.

TABLE I

| Example | Nitrogen Additive | Cold Paste | Hot Paste | Cracking | Bond |
|---|---|---|---|---|---|
| 6a | Urea | 352 | 180 | None | Good |
| 6b | Thiourea | 2230 | 2920 | None | Good |
| 6c | Guanidine (HCl) | 134 | 107 | None | Good |
| 6d | Biurea | 195 | 110 | None | Good |
| 6e | Biuret | 264 | 192 | None | Good |
| 6f | Dicyandiamide | 218 | 208 | None | Good |

The formulas for the above nitrogen additives are urea, $(H_2N)_2C:O$; thiourea, $(H_2N)_2C:S$; guanidine, $(H_2N)_2C:NH$; biurea, $[NH(H_2N)C:(]_2$; biuret, $HN[(H_2N)C:O]_2$; dicyandiamide, $NCNH(H_2N)C:O$. From these formulas the similarity of structure is obvious.

EXAMPLE 7

Joint compounds were formulated using a binder from Gogek U. S. Pat. No. 3,411,926, a partially gelatinized oxidized corn starch and binder from Example 4b. Formulation was the same as Example 1, except that the binder was varied from 5 percent to 3 percent with limestone flour making up the difference. Table II contains results of tests on these joint compounds, performed according to A.S.T.M. C 475–64 methods.

TABLE II

| Binder | $H_2O$ cc/100 gms | Wedge Cracking | Paper | Bond % | Wall |

| | | Tape | | | Board |
|---|---|---|---|---|---|
| Gogek | 65 | None | Good | 3 | Fail |
| Gogek | 65 | Some Small | Good | 4 | Fail |
| Gogek | 65 | Many Large & Small | Good | 5 | Fail |
| Ex. 4b | 68 | None | Good | 3 | Good |
| Ex. 4b | 68 | None | Good | 4 | Good |
| Ex. 4b | 68 | None | Good | 5 | Good |

These results emphasize the differences between prior art cereal binders and the binder of this invention.

EXAMPLE 8

A product was made by preparing the binder using second clear wheat flour mixed with 10 percent urea based on flour weight. Water was added to bring the moisture of the flour mix to 18 percent. This was extruded at a maximum temperature of 150° C. to give a product with a cold paste Brookfield viscosity at 10 percent solids of 262 cps. and a hot paste Brookfield viscosity of 1150 cps. When used in the formulation of Example 2, the bond to the paper tape was 85–90 percent rather than 95–100 percent as with corn based binders. Workability of this binder was judged to be tackier than the corn based binder demonstrating the wide difference in workability possible using the technique disclosed in this teaching.

EXAMPLE 9

A binder was prepared using milo grits as a starting material. The milo grits were blended with urea in a ratio of 9:1 and the resulting mix brought to 18 percent water content. This mix was extruded to give a product with 119 cps. Brookfield cold paste and an 87 cps. Brookfield hot paste. When used in the joint compound formulation of Example 2, bond and wedge cracking were excellent.

EXAMPLE 10

Two binders were made from corn grits using different levels of urea. These were extruded after adjusting to 18 percent moisture at a temperature of 150° C. maximum. Table III shows urea level, analytical data and test results on these binders used in joint compound formulation from Example 2.

TABLE III
Results using corn grits and different urea levels

| Parts corn grits | Parts urea by wt. | Cold paste | Hot paste | Edge crack | Wedge crack | Bond tape | Wallboard | Spreading consistency, cc. H₂O 100 gms. |
|---|---|---|---|---|---|---|---|---|
| 19 | 1 | 333 | 234 | None | None | Good | Good | .68 |
| 17 | 3 | 256 | 202 | do | do | do | do | 70 |

The only difference in these two samples is the amount of water per 100 gms. joint compound needed to get spreading consistency. The lower cold viscosity binder requires higher water addition to get comparable viscosity used in joint compound.

It is well known that wallboard joint compounds are suitable as dry wall finishes, usually with the addition of water, and, in certain instances, with the addition of aggregate, and in the claims, where the term wallboard joint compound is used, it is to be understood that this also comprehends compounds suitable for such finishes.

What I claim is:

1. A method of manufacturing a wallboard joint compound comprising the steps of preparing a binder by combining a nitrogen compound with a gelatinized unoxidized amylaceous material using water in an amount less than 20 percent of the total mix, and heating the mixture to bring the temperature to between 75° C and 180° C while the gelatinized material and nitrogen compound are both present; and mixing a minor proportion of the binder with a major proportion of a joint compound filler, the nitrogen compound being in the amount of 3 percent–20 percent based on the weight of the amylaceous material and being of the family containing the chemical grouping

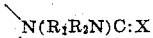

where X is O, S, or NH and where $R_1$ is H or $CH_3$ and where $R_2$ is H or $CH_3$.

2. A method as set forth in claim 1 in which the amylaceous material is cereal grain or an amylaceous fraction thereof.

3. A method as set forth in claim 1 in which the nitrogen compound is urea.

4. A method as set forth in claim 1 in which the nitrogen compound is of the general formula $(R_1R_2N)_2C{:}X$ where $R_1$ and $R_2$ are H or $CH_3$, and X is O or S.

5. A method as set forth in claim 1 in which the nitrogen compound is of the family containing the chemical grouping

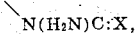

where X is O, S, or NH.

6. A method as set forth in claim 1 in which the nitrogen compound is selected from the group comprising the following: urea, guanidine, thiourea, biurea, biuret, and dicyandiamide.

7. A method as set forth in claim 1 in which the amylaceous material is selected from a group comprising corn flour, corn starch, grain sorghum flour, corn meal, corn grits, milo meal, milo grits, and wheat flour.

8. A method as set forth in claim 1 in which the binder is 3.0 percent–10.0 percent of the total weight of the joint compound, and wherein the filler is 90 percent–97 percent of the total weight of the joint compound.

9. A method as set forth in claim 3 in which the binder includes a minor percentage of polyvinyl alcohol.

10. A method as set forth in claim 1 in which the gelatinization of the amylaceous material and the heating of the binder mixture are effected by extrusion.

11. A wallboard joint compound comprising a mixture of a major proportion of a joint compound filler and a minor proportion of a binder wherein the binder comprises a mixture of a nitrogen compound from the family containing the chemical grouping

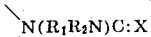

where X is O, S, or NH and where $R_1$ is H or $CH_3$ and where $R_2$ is H or $CH_3$, and a gelatinized unoxidized amylaceous material, with the association of said mixture having been effected by heating to a temperature between 75° C and 180° C, the nitrogen compound being present in the amount of 3 percent–20 percent based upon the weight of the amylaceous material.

12. A wallboard joint compound as claimed in claim 11 in which the amylaceous material is cereal grain or an amylaceous fraction thereof.

13. A wallboard joint compound as claimed in claim 11 in which the nitrogen compound is urea.

14. A wallboard joint compound as claimed in claim 11 in which the nitrogen compound is selected from a group comprising the following: urea, biurea, biuret, thiourea, guanidine, and dicyandiamide.

15. A wallboard joint compound as claimed in claim 11 in which the nitrogen compound is of the general formula $(R_1R_2N)_2C:X$, where $R_1$ and $R_2$ are H or $CH_3$, and X is O or S.

16. A wallboard joint compound as claimed in claim 11 in which the nitrogen compound is of the family containing the chemical grouping

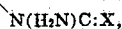

where X is O, S, or NH.

17. A wallboard joint compound as claimed in claim 11 in which the amylaceous material is selected from the group comprising the following: corn flour, corn starch, grain sorghum flour, corn meal, corn grits, milo meal, milo grits, and wheat flour.

18. A wallboard joint compound as claimed in claim 11 in which the filler is 90 percent–97 percent of the total weight of the joint compound, and in which the binder is 3 percent–10 percent of the total weight of the joint compound.

19. A wallboard joint compound as claimed in claim 11 in which the binder includes a minor percentage of polyvinyl alcohol.

* * * * *